United States Patent
Hall et al.

(10) Patent No.: US 10,125,784 B2
(45) Date of Patent: Nov. 13, 2018

(54) FAN ASSEMBLY

(71) Applicant: Revcor, Inc., Carpentersville, IL (US)

(72) Inventors: Craig R. Hall, Hartford, WI (US);
Richard R. Shelby, Huntley, IL (US);
Dominic Phillip Menoni, Lake Zurich, IL (US); Stephen A. Adamski, Prospect Heights, IL (US); Michael F. Buckley, Rockford, IL (US)

(73) Assignee: Revcor, Inc., Carpentersville, IL (US)

(*) Notice: Subject to any disclaimer, the term of this patent is extended or adjusted under 35 U.S.C. 154(b) by 343 days.

(21) Appl. No.: 14/517,212

(22) Filed: Oct. 17, 2014

(65) Prior Publication Data
US 2015/0037154 A1 Feb. 5, 2015

Related U.S. Application Data

(63) Continuation of application No. 13/022,250, filed on Feb. 7, 2011, now Pat. No. 8,881,396.

(51) Int. Cl.
*F04D 29/28* (2006.01)
*F04D 29/02* (2006.01)
(Continued)

(52) U.S. Cl.
CPC .............. *F04D 29/283* (2013.01); *F01D 5/14* (2013.01); *F01D 5/30* (2013.01); *F04D 29/023* (2013.01);
(Continued)

(58) Field of Classification Search
CPC .... F04D 29/283; F04D 29/282; F04D 29/263; F04D 29/023; F01D 5/30; F01D 5/14;
(Continued)

(56) References Cited

U.S. PATENT DOCUMENTS 641,328 A * 1/1900 Royal .................. B02B 3/045
    416/178
683,832 A 10/1901 Baker
    (Continued)

FOREIGN PATENT DOCUMENTS

JP 2001271791 A 10/2001

OTHER PUBLICATIONS

Extended European Search Report from the corresponding European Application No. 12154066.0, dated Feb. 24, 2015, 11 pages.
(Continued)

*Primary Examiner* — Sarang Afzali
(74) *Attorney, Agent, or Firm* — Fitch Even Tabin & Flannery LLP

(57) ABSTRACT

In one aspect, a fan assembly is provided that can be manufactured while producing a significantly reduced amount of scrap material. More specifically, the fan assembly utilizes a hub ring and one or more hub strips to support a plurality of blades rather than a solid center disc or end disc used by some prior approaches. In another aspect, a method is provided that includes bending a member into an annular configuration and joining end portions of the member together to rigidly fix the member in the annular configuration. The rigid annular member may be used as an end ring, a hub ring, an orifice, or other component, while producing significantly less scrap material than traditional approaches.

6 Claims, 16 Drawing Sheets

(51) Int. Cl.
*F04D 29/26* (2006.01)
*F01D 5/14* (2006.01)
*F01D 5/30* (2006.01)

(52) U.S. Cl.
CPC ......... *F04D 29/263* (2013.01); *F04D 29/282* (2013.01); *F05D 2230/23* (2013.01); *Y10T 29/49321* (2015.01); *Y10T 29/49329* (2015.01); *Y10T 29/49922* (2015.01); *Y10T 29/49938* (2015.01)

(58) Field of Classification Search
CPC ........... F05D 2230/23; Y10T 29/49321; Y10T 29/49922; Y10T 29/49938; Y10T 29/49329
See application file for complete search history.

(56) References Cited

U.S. PATENT DOCUMENTS

| | | | |
|---|---|---|---|
| 1,614,269 A * | 1/1927 | Woodruff | A01D 75/306 239/654 |
| 1,673,073 A | 6/1928 | Houghtby | |
| 1,959,736 A * | 5/1934 | Rademacher | B07B 13/11 193/12 |
| 1,967,821 A * | 7/1934 | Hess | B21K 1/04 29/898.066 |
| 2,419,411 A | 4/1947 | Mayne | |
| 2,496,179 A | 1/1950 | Schwarz | |
| 2,684,521 A | 7/1954 | Morrison, Jr. | |
| 2,915,240 A * | 12/1959 | Kochevar | F04D 29/283 29/889.4 |
| 2,932,445 A * | 4/1960 | Hathaway | B23P 15/006 29/513 |
| 3,156,408 A * | 11/1964 | Whitenack, Jr. | F04D 29/283 415/53.1 |
| 3,228,591 A | 1/1966 | Goettl et al. | |
| 3,402,451 A | 9/1968 | Beesley et al. | |
| 3,450,337 A | 6/1969 | Jolette | |
| 3,711,914 A | 1/1973 | Baker | |
| 3,737,966 A | 6/1973 | Ranz | |
| 3,844,682 A | 10/1974 | Morris | |
| 3,854,844 A | 12/1974 | Ranz | |
| 3,970,411 A | 7/1976 | Wallman | |
| 4,041,593 A | 8/1977 | Wallman | |
| 4,059,215 A | 11/1977 | Owen et al. | |
| 4,086,028 A | 4/1978 | Felter | |
| 4,289,450 A | 9/1981 | Kling | |
| 4,315,357 A | 2/1982 | Calvano | |
| 4,320,565 A * | 3/1982 | Warchol | B21D 53/12 29/898.067 |
| 4,329,118 A | 5/1982 | Ranz | |
| 4,458,400 A | 7/1984 | Friedericy et al. | |
| 4,515,527 A | 5/1985 | Baker | |
| 4,603,773 A | 8/1986 | Ducate | |
| 4,653,635 A | 3/1987 | Ducate | |
| 4,701,157 A | 10/1987 | Potter | |
| 4,723,431 A | 2/1988 | McKindary | |
| 4,784,256 A | 11/1988 | Ducate | |
| 4,787,818 A | 11/1988 | Bales | |
| 5,013,215 A | 5/1991 | Diehl | |
| 5,075,964 A | 12/1991 | Galliet | |
| 5,341,665 A | 8/1994 | Christophel et al. | |
| 5,685,695 A | 11/1997 | Klement et al. | |
| 5,873,164 A | 2/1999 | Klement et al. | |
| 5,934,876 A | 8/1999 | Nagy | |
| 6,179,566 B1 | 1/2001 | Nagy | |
| 6,206,640 B1 | 3/2001 | Andulics et al. | |
| 6,220,818 B1 | 4/2001 | Andulics et al. | |
| 6,416,285 B1 | 7/2002 | Fichter | |
| 6,609,893 B2 | 8/2003 | Dobrzeniecki | |
| 6,776,582 B2 | 8/2004 | Segawa et al. | |
| 7,017,599 B2 | 3/2006 | Keefer | |
| 7,052,237 B2 | 5/2006 | Segawa et al. | |
| 7,568,493 B2 | 8/2009 | Keefer | |
| 8,881,396 B2 | 11/2014 | Hall et al. | |

OTHER PUBLICATIONS

The Engineering Toolbox, Types of Fans: Axial and propeller fans, centrifugal (radial) fans, mixed flow fans and cross flow fans, http://www.engineeringtoolbox.com/fan-types-d_142.html, accessed Oct. 7, 2010, 3 pages.

Ebm-Mulfingen GmbH & Co. KG, ebmpapst: Centrifugal fans and blowers, version 07, http://www.ebmpapst.com/media/content/info-center/downloads_10/catalogs/centrifugal_fans_1/Centrifugal_fans_200; accessed Jun. 25, 2010, 616 pages.

Partial European Search Report from the corresponding European Application No. 12154066.0, dated Dec. 12, 2014, 6 pages.

Second Office Action from the corresponding European Application No. 12154066.0, dated May 17, 2016, 7 pages.

* cited by examiner

FAN ASSEMBLY

CROSS-REFERENCE TO RELATED APPLICATION

This application is a continuation of U.S. patent application Ser. No. 13/022,250, filed Feb. 7, 2011, which issued as U.S. Pat. No. 8,881,396 on Nov. 11, 2014, which is incorporated herein by reference in its entirety.

FIELD

The field relates to fans and, more particularly, to fan assemblies for handling airflow.

BACKGROUND

Centrifugal or forward curved blower wheels may generally comprise a plurality of blades arranged in the form of a cylinder around a solid, central hub disc. During manufacture of a centrifugal blower wheel, a stamping press may be used to form the plurality of blades from a metal sheet. The sheet is gathered between the ends of adjacent blades to reduce the distance between the blades. The sheet, with the material gathered between the blades, is then shaped into a cylinder about the solid, central hub disc. Because the blades are stamped from a single metal sheet, the number of blades and the chords of the blades are limited by the size of the blades and the size of the sheet.

The solid, central hub disc of the centrifugal blower wheel may be formed by stamping a pair of discs from respective rectangular pieces of sheet metal, removing the scrap material for recycling, and joining the discs together. A centrifugal blower wheel may also have one or more end rings deformed onto ends of the plurality of blades to fix the blades in the cylindrical arrangement about the central hub disc. Like the central hub disc, the end rings may be formed by stamping circular rings from rectangular pieces of sheet metal and removing the scrap material for recycling. Stamping the one or more end rings generates additional scrap because each end ring has a central opening formed by removing a circular disc from the center of the end ring. In one approach, the scrap material removed from an end ring to form the central opening can be used as a solid, central hub disc for the centrifugal blower wheel. Although scrap material produced during manufacture of the centrifugal blower wheel may be recycled, the value of the recycled material may not compensate for the costs incurred in cutting, storing, and handling the scrap material.

Mixed flow fans, backward inclined wheels, backward curved wheels, and other centrifugal wheels may have a back disc and an end ring that are both stamped from rectangular pieces of metal, like the central hub disc and end ring(s) of centrifugal blower wheels. Because the back disc and the end ring have a generally circular shape, stamping the circular shapes from rectangular pieces of sheet metal produces scrap in the form of the corner portions of the sheet metal and a circular disc from the center of the end ring. Similarly, traditional approaches for producing a venturi or orifice for a fan assembly or a fan housing include stamping a generally ring-shaped orifice from a rectangular piece of metal. Even if the scrap circular disc from the end ring or orifice is used to produce a back disc, the corner portions of the sheet located outside of the end ring or orifice would still constitute a large amount of scrap material.

DETAILED DESCRIPTION OF THE PREFERRED EMBODIMENTS

In one aspect, a method is provided that minimizes the amount of scrap material produced during manufacture of blower wheel or fan assemblies and related components. Rather than stamp circular parts from rectangular sheets of metal, as in traditional approaches, a narrow strip of material is advanced from a coil and bent along a longitudinal edge of the strip to form a helix. An open annular member is cut from the helix and trimmed as needed before the ends of the open annular member are joined together to form a rigid, annular member. The rigid annular member may be used in place of traditional orifices and fan assembly end rings, to name a few applications. Further, by joining the rigid, annular member with one or more hub strips to produce a hub assembly, the rigid annular member may be used in place of central or end discs of traditional fan assemblies.

In another approach, a fan assembly is provided that minimizes the amount of scrap material produced during manufacture of the fan assembly. More specifically, the fan assembly does not utilize a solid disc traditionally used as a center or end disc for blower wheels, mixed flow fans, or other centrifugal air moving devices. Instead, the fan assembly has a hub assembly comprising a hub ring and one or more hub strips. Each hub strip has an attachment portion connected to the hub ring and a body portion extending radially inward from the attachment portion. The one or more hub strips are configured to connect directly or indirectly to a motive source, such as an electric motor, a diesel or gasoline engine, or a turbine, using known mechanical linkages. In one approach, the one or more hub strips are connected to a hub that is fixed to a driveshaft of an electric motor. In another approach, the one or more hub strips have a mounting point or feature for attachment to a shaft or clamp. As is apparent, the hub assembly transmits rotation from the motive source to the fan assembly without the use of a solid disc, as in traditional fan assemblies.

Figure 1:
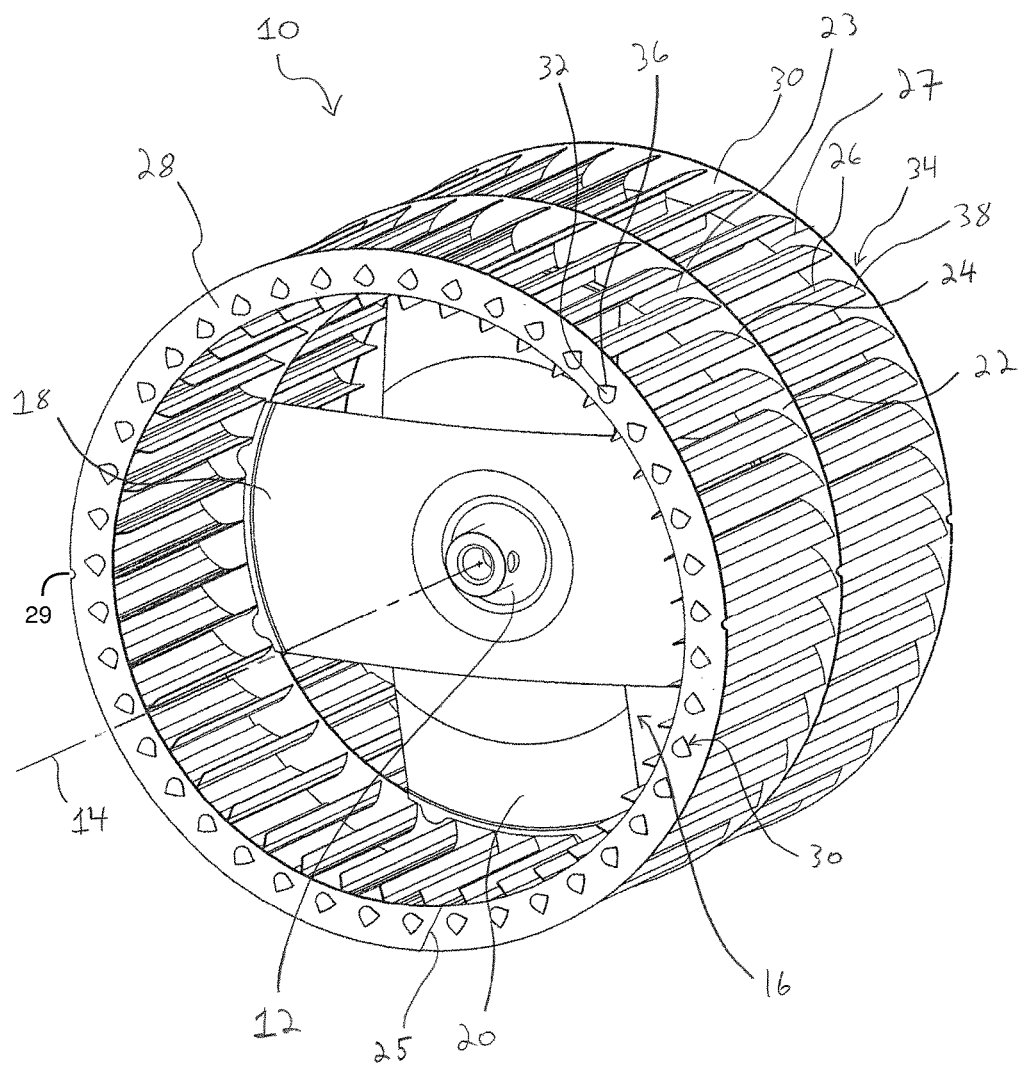
FIG. 1 is a perspective view of a fan assembly.

Turning to the Figures, FIG. 1 illustrates a fan assembly 10 that produces a minimal amount of scrap material during production. The fan assembly 10 has a hub 12 for engaging a motor drive shaft (not shown) and transmitting rotation of the drive shaft to the fan assembly 10 such that the fan assembly 10 rotates about an axis of rotation 14. The hub 12 is part of a hub assembly 16 that includes the hub 12, one or more hub strips 18, 20, and a hub ring 22. The hub strips 18, 20 connect the hub 12 to the hub ring 22. In an alternative embodiment, the hub 12 is integrally formed with the hub strips 18, 20.

The hub ring 22 has a plurality of attachment points, such as slots 24, for engaging a plurality of fan blades 26. Each fan blade 26 extends between a pair of end rings 28, 30 and through an associated slot 24 in the hub ring 22. The hub ring 22 and end rings 28, 30 are each formed from an elongate member, such as a strip of material, bent into an annular configuration with respective line welds 23, 25, 27 fixing the rings 22, 28, 30 in their annular configuration, as will be discussed in greater detail below. The end rings 28, 20 may have one or more notches 29. The hub strips 18, 20, hub ring 22, and end rings 28, 30 may be formed from steel, aluminum, or galvanized steel, among other materials. In alternative approaches, the hub ring 22 and the end rings 28, 30 may be fixed in an annular configuration without line welds 23, 25, 27, such as by features integral to the rings, spot welding, parent metal fastening, or mechanical fasteners.

In one approach, each fan blade 26 has a pair of tabs 32, 34 extending through respective slots 36, 38 in the end rings 28, 30. The tabs 32, 34 are bent downward against the end rings 28, 30 to fix the blades 26 to the end rings 28, 30. In alternative embodiments, the fan assembly 10 may be a single-inlet type fan assembly with a hub ring 22 and only one end ring 28. Alternative embodiments may also include attachment points such as rivets or welds that connect the blades 26 to the hub ring 22 and end ring(s) 28 (and 30) without the use of tabs or slots. For example, a Fergas peening process may be used to connect the blades 26 to the end ring(s) 28 (and 30).

Figure 2:
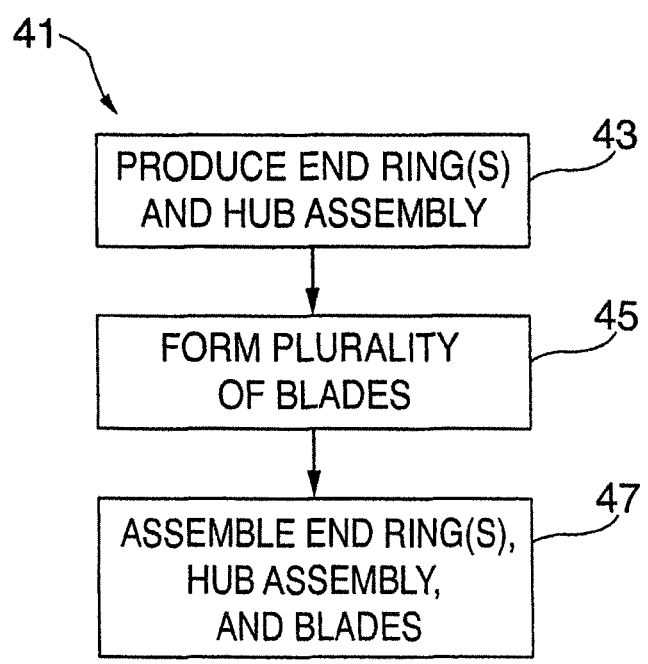
FIG. 2 is a flow diagram of a method of manufacturing the fan assembly of FIG. 1.

FIG. 2 illustrates a method 41 of manufacturing the fan assembly 10 while producing a minimal amount of scrap material. The method 41 includes producing the hub assembly 16 and the end rings 28, 30 at step 43. For some embodiments of the fan assembly 10, such as a single-inlet blower wheel, only one end ring will be produced. The plurality of blades 26 are manufactured at step 45 with a profile that allows the fan assembly 10 to flow air more efficiently, as will be discussed in greater detail below. The hub assembly 16, end rings 28, 30, and blades 26 are then assembled at step 47 to produce the fan assembly 10.

Figure 3:
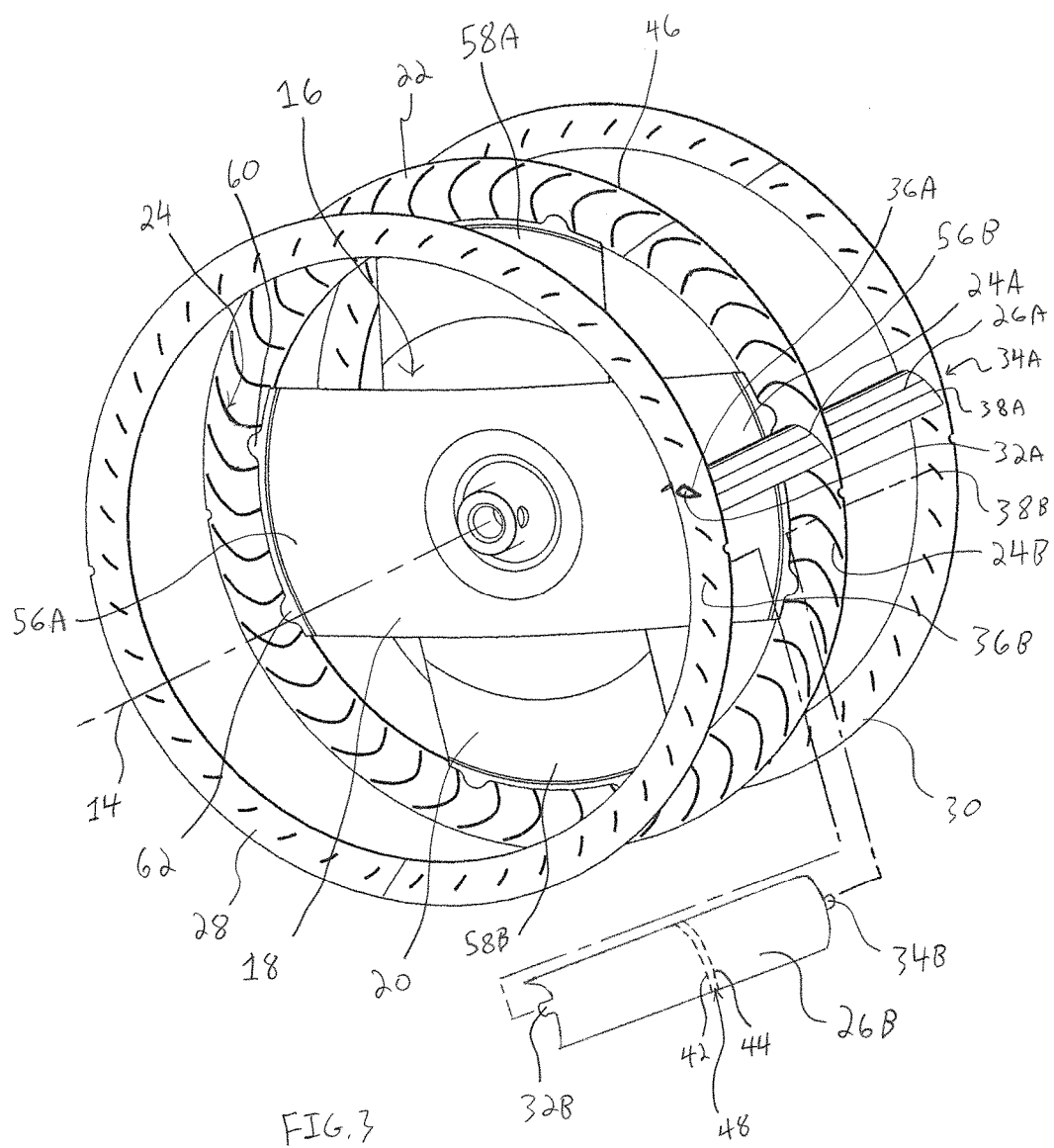
FIG. 3 is a perspective view of the fan assembly of FIG. 1 with all but two fan blades removed.

Turning to further details of the fan assembly 10, FIG. 3 illustrates the fan assembly 10 with all but two blades 26A, 26B removed to show the positioning of the hub assembly 16 between the end rings 28, 30. One of the blades illustrated, blade 26A, extends between the end rings 28, 30 with tabs 32A, 34A extending through respective slots 36A, 38A. Blade 26B is connected to the hub ring 22 and the end rings 28, 30 by advancing a tab 34B through slot 24B in the hub ring 22 until the tab 34B passes through slot 38B in the end ring 30. A tab 32B of the blade 26B is then advanced through a slot 36B in the end ring 28 before the tabs 32B, 34B are bent downward against the end rings 28, 30 to fix the blade 26B to the end rings 28, 30. To fix the blade 26B to the hub ring 22, an embossing process forms ridges (not shown) in the blade 26B along paths 42, 44 on either side of hub ring 22 to restrict the hub ring 22 from sliding along the blade 26B. A similar procedure may be performed to install the remaining blades 26 of the fan assembly 10.

In an alternative approach, each slot 24 of the hub ring 22 extends all the way to an outer edge 46 of the hub ring 22. With this configuration, the blade 26B may be connected to the hub assembly 16 and the end rings 28, 30 by passing a center portion 48 of the blade 26B through the slot 24B in a radially inward direction toward the axis 14. The blade 26B is then manipulated to advance tabs 32B, 34B through respective slots 36B, 38B before the blade 26B is secured to the hub ring 22 and the end rings 28, 30 as described above.

As shown in FIG. 3, the hub strips 18, 20 include attachment portions 56A, 56B and 58A, 58B, respectively. With reference to the attachment portion 56A, the attachment portion 56A includes tabs 60, 62 that are welded to the hub ring 22. The tabs of the hub assembly 16 are sized to fit between the slots 24. Although the attachment portions 56A, 56B, 58A, 58B are illustrated with tabs for welding to the hub ring 52, the attachment portions 56A, 56B, 58A, 58B may connect to the hub ring 22 using any number of approaches, including but not limited to nuts and bolts, rivets, spot welds, line welds, and parent metal fastening.

Figure 4:
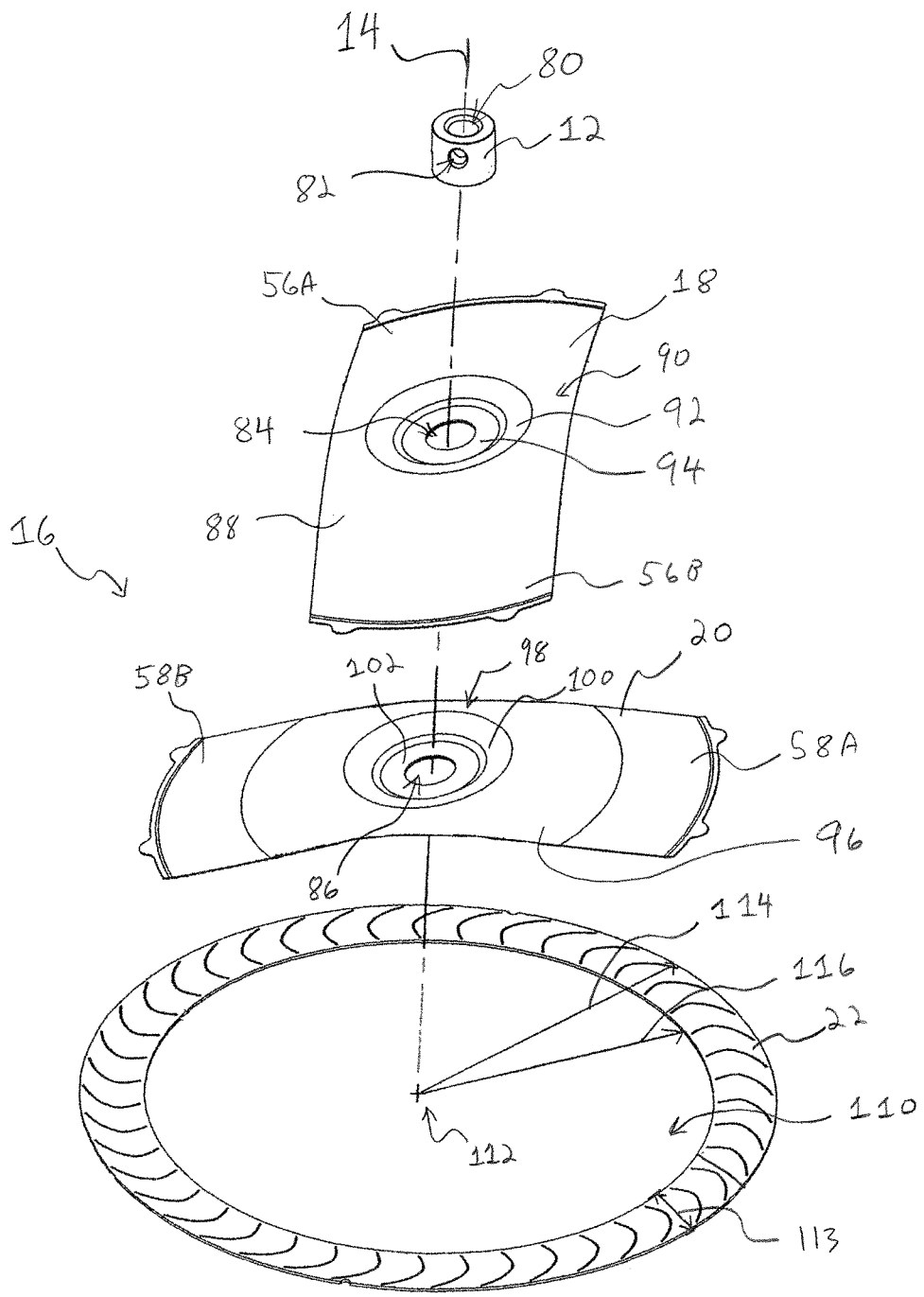
FIG. 4 is an exploded perspective view of a hub assembly of the fan assembly of FIG. 1.

Turning to FIG. 4, an exploded view of the hub assembly 16 is illustrated. The hub 12 has a through bore 80 aligned with the axis of rotation 14 for receiving a motor drive shaft (not shown) and an opening 82 for receiving a set screw (not shown) which secures the hub 12 to the motor drive shaft. The hub 12 may be cold headed from wire, machined from 12L14 steel bar stock, or any other acceptable manufacturing process and/or material. The hub 12 is generally received within openings 84, 86 of the hub strips 18, 20 and is connected to the hub strips 18, 20 using, for example, an orbital press, swedging, and/or staking.

The hub strip 18 includes a body portion 88 extending between the attachment portions 56A, 56B. In the illustrated embodiment, the hub 12 is a separate component from the hub strips 18, 20 and the hub strips 18, 20 have features for aligning the hub strips 18, 20 and receiving the hub 12. More specifically, the body portion 88 includes a hub mounting portion 90 having a concave seat 92 that tapers downward toward a circular flat 94 extending about the opening 84. Similarly, the hub strip 20 has a body portion 96 extending between attachment portions 58A, 58B. The body portion 96 has a hub mounting portion 98 with a concave seat 100 and a circular flat 102 that are complimentary to the seat 92 and the flat 94 of the hub strip 18 such that the hub mounting portions 90, 98 may nest together when the hub assembly 16 is assembled. Alternatively, the hub mounting portions 90, 98 may be flat and lack seats 92, 100 or other structures that nest together.

The hub ring 22 defines a central opening 110 having a center point 112 aligned with the axis 14, as shown in FIG. 4. The hub ring 22 has an outer radius 114 and an inner radius 116 that define a width 113 of the hub ring 22. When the hub strips 18, 20 are connected to the hub ring 22, the body portions 88, 96 extend across the central opening 110 and provide a rigid connection between the hub 12 and the hub ring 22.

Figure 5:
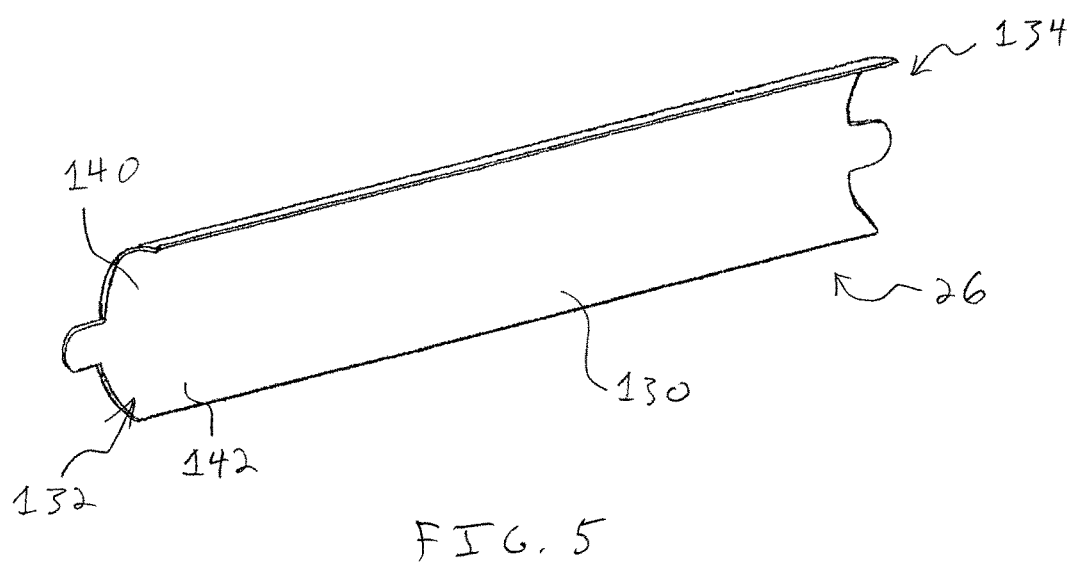
FIG. 5 is a perspective view of a fan blade of the fan assembly of FIG. 1.

As shown in FIG. 5, the blade 26 has a body portion 130 with a pair of opposed end portions 132, 134. The blade 26 has an outlet portion 140 with an outlet angle and an inlet portion 142 with an inlet angle. Preferably, the outlet angle is different than the inlet angle, although the outlet portion 140 and the inlet portion 142 may have similar angles. In the illustrated embodiment, the blade 26 has a compound radius design, with the outlet portion 140 and inlet portion 142 each having a different radius of curvature, although other embodiments may have a similar radius of curvature for portions 140, 142. The blade 26 moves more air than traditional fan blade designs for a given blade size, which allows a fan assembly utilizing the blade 26 to have fewer blades while flowing the same amount of air as traditional fan assemblies. Conversely, a fan assembly utilizing the blade 26 and having the same number of blades as a traditional fan assembly will flow a greater amount of air and generate a higher static pressure than a traditional fan assembly.

The blade 26 may be formed using, for example, roll forming or stamping. To control consistency during mass production, the blade 26 may be embossed after forming to limit spring-back of the blade 26 and provide more consistent tolerances of the blade 26. Further, the blade 26 may be made from a number of materials, including but not limited to galvanized steel, aluminum, and plastic. For plastic blades, a rigid or semi-rigid plastic may be chosen, such as polypropylene. A plastic blade may be molded or extruded.

Figure 6:
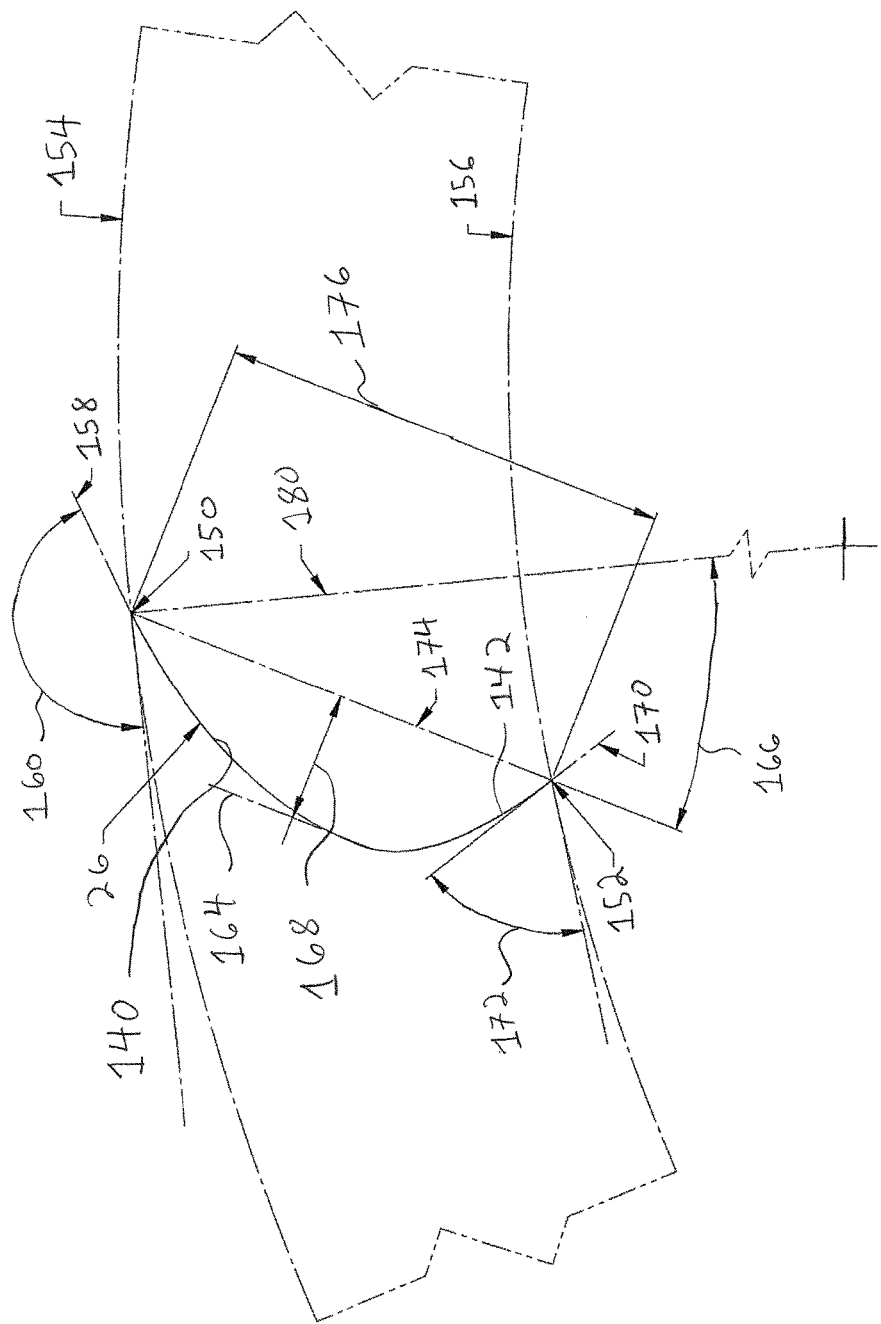
FIG. 6 is a side elevational view of the fan blade of FIG. 5.

As shown in FIG. 6, the blade 26 extends between an outlet tip 150 and an inlet tip 152 that travel along an outer diameter 154 and inner diameter 156, respectively, as the fan assembly 10 rotates. In one approach, the outer diameter 154 is in the range of approximately 9.66 inches to approximately 11.80 inches, preferably 10.73 inches. A ratio of the outer diameter 154 to the inner diameter 156 is preferably within the following range:

$$1.0 < \frac{Diameter_{154}}{Diameter_{156}} \leq 2.0$$

In other approaches, the diameters 154, 156 may be increased or decreased with corresponding adjustments to the other dimensions of the blade 26 to accommodate different applications of the blade 26. The outlet portion 140 of the blade 26 extends inward from the outlet tip 150 along a plane 158. The plane 158 is oriented at an angle 160 relative to the outer diameter 154, the angle 160 being in the range of approximately 100° to approximately 180°, preferably 160°. The outlet portion 140 converges with a plane 164 that extends parallel to a plane 174. A blade camber distance 168 separates the plane 164 from the plane 174, the blade camber distance 168 being in the range of approximately 0.150 inches to approximately 0.375 inches, preferably 0.287 inches. The plane 174 extends a chord distance 176 between the tips 150, 152. The chord distance 176 is in the range of approximately 0.890 inches to approximately 1.088 inches, preferably approximately 0.989 inches. A ratio of the chord distance 176 to the blade camber distance 168 is preferably within the following range:

$$1.5 \leq \frac{Distance_{176}}{Distance_{168}} \leq 10.0$$

Given this chord/camber ratio and the chord distance 176, the blade camber distance 168 for a desired chord/camber ratio may be calculated by dividing the chord distance 176 by the desired chord/camber ratio. A plane 180 generally extends along a radius of the diameters 154, 156, and intersects blade tip 150. The plane 174 is oriented at a blade setting angle 166 relative to the plane 180. The blade setting angle 166 is in the range of approximately 10° to approximately 40°, preferably approximately 27.4°. An inlet portion 142 extends away from the plane 164 and converges with a plane 170 at the inlet tip 152. The plane 170 is oriented at an angle 172 relative to the inner diameter 156, the angle 172 being in the range of approximately 45° to approximately 70°, preferably 63°. Given the outer diameter 154, the ratio of the outer diameter 154 to the inner diameter 156, and the blade setting angle 166, the chord distance 176 can be determined using the following equation:

$$Distance_{176} = \frac{Diameter_{154}}{2} \cos(Angle_{166}) \pm \sqrt{\left(\frac{Diameter_{156}}{2}\right)^2 - \left(\frac{Diameter_{154}}{2}\right)^2 \sin^2(Angle_{166})}$$

Figure 7:
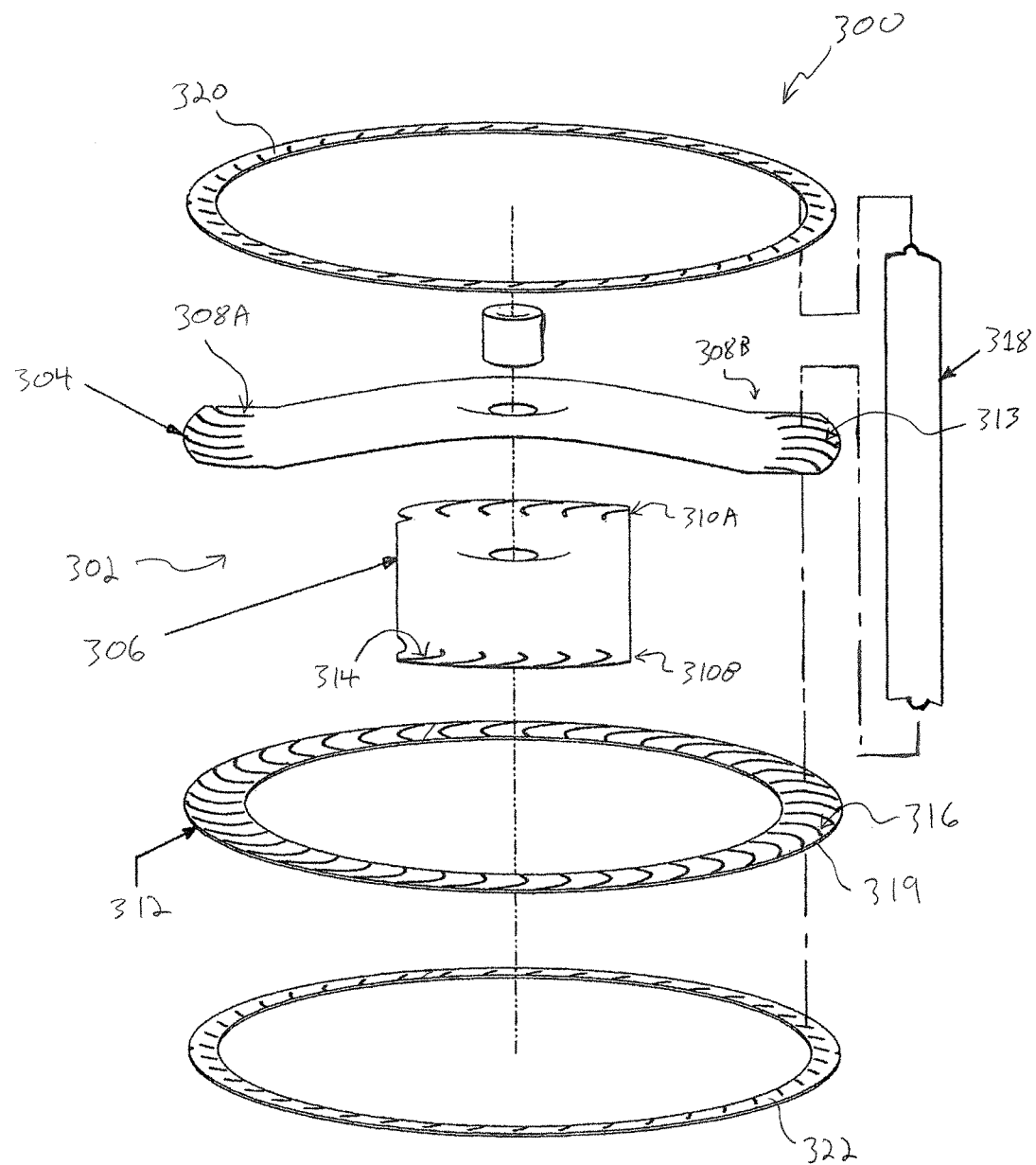
FIG. 7 is an exploded perspective view of another fan assembly with only one blade shown for clarity.

Another embodiment of a fan assembly 300 having a hub assembly 302 is shown in FIG. 7. The fan assembly 300 is similar to the fan assembly 10, with the exception that the hub strips 304, 306 have attachment portions 308A, 308B and 310A, 310B which lack tabs for engaging a hub ring 312. Instead, the attachment portions 308A, 308B and 310A, 310B have slots 313, 314 which align with slots 316 of the hub ring 312. To secure the hub strips 304, 306 to the hub ring 312, each blade 318 is passed through one of the plurality of slots 313 (or 314) and one of the plurality of slots 316 before ridges are embossed in the blade 318 to fix the hub strip 304 (or 306) and the hub ring 312 between the ridges, as discussed above with respect to fan assembly 10. The hub strips 304, 306 may alternatively be connected to the hub ring 312 using welds, rivets, or other approaches. Further, slots 313 (or 314) and the slots 316 may extend to an outer edge 319 of the hub ring 316 to accommodate radial insertion of the blades 318, as discussed above.

Figure 8:
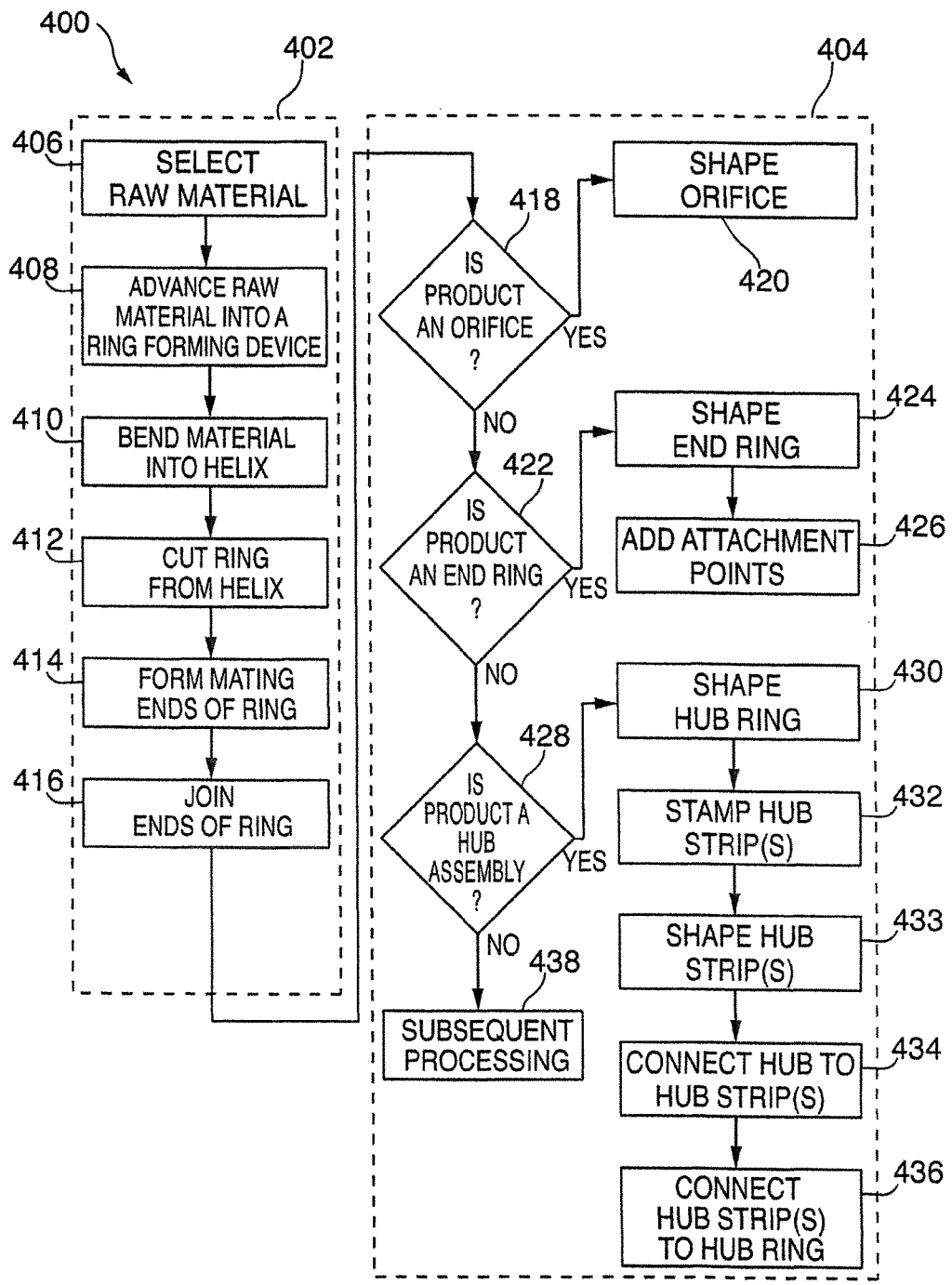
FIG. 8 is a flow diagram of a method of producing parts of fan assemblies and other components.

FIG. 8 illustrates a method 400 of producing a product, such as the end rings 28, 30 or the hub assemblies 16, 302 of the fan assemblies 10, 300, while generating a minimal amount of scrap material. The method 400 comprises a ring forming sub-method 402, explained with reference to FIGS. 9-13B, and a finishing sub-method 404, explained with reference to FIGS. 1 and 14-16. Although the method 400 is described in steps, it will be appreciated that the steps may be modified, combined, removed, or performed in a different order than the order presented. Further, additional or fewer actions may be performed at each step without departing from the teachings of this disclosure. If the method 400 is used to produce an orifice, end ring, or hub assembly, the method 400 provides a material yield of nearly 100%, which is at least a 33% improvement over traditional processes.

Figure 9:
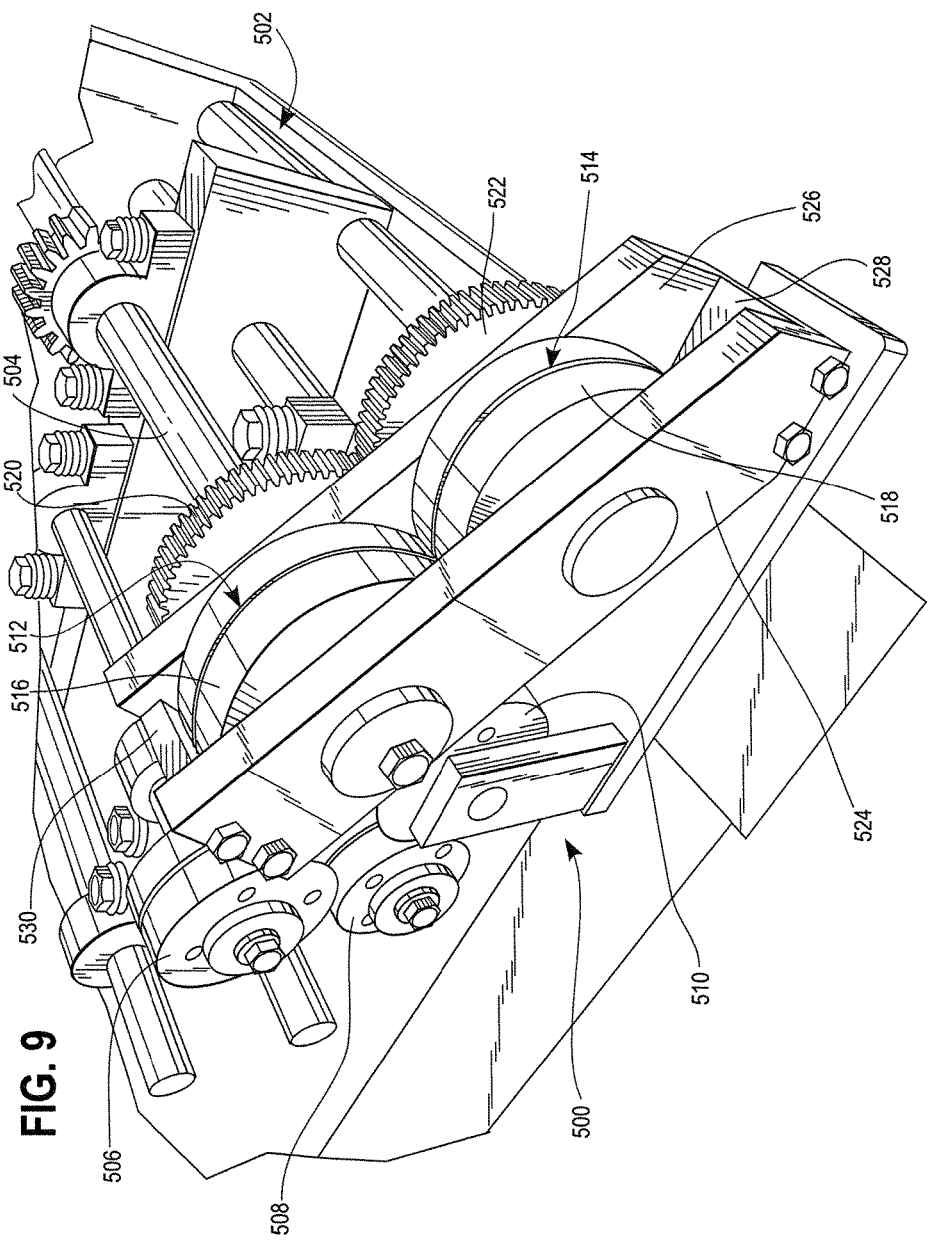
FIGS. 9-13 are perspective views of a ring forming sub-method of the method of FIG. 8.

In one approach, the method 400 utilizes a ring forming device 500, shown in FIG. 9, to shape a raw material into a ring during the ring forming sub-method 402. For example, the raw material may be a strip of material 540 (see FIG. 10) such as aluminum, steel, galvanized steel, coated steel, or other materials which can be advanced from a coil of the raw material. In the illustrated embodiment, the ring forming device 500 is connected to a roll forming machine 502 to utilize rotation of a shaft 504 of the roll forming machine 502. In another embodiment (not shown), the ring forming device 500 may be a stand-alone device with a dedicated drive motor. Returning to FIG. 9, the strip of material 540 is advanced between feed rollers 506, 508, 510 and into slots 512, 514 on a pair of forming rollers 516, 518. The feed rollers 506, 508 and forming rollers 516, 518 are driven to advance the strip of material 540 through the ring forming device 500. More specifically, a powered roller drives the feed rollers 506, 508. Similarly, a drive shaft 504 rotates a drive gear 520 and the roller 516 which is attached to the drive gear 520. Rotation of the drive gear 520 rotates follower gear 522 and the roller 518 connected thereto in an opposite direction. A pair of arms 524, 526 hold the rollers 516, 518 relative to one another, with plates 528, 530 rigidly fixing the arms 524, 526 together.

Figure 10:
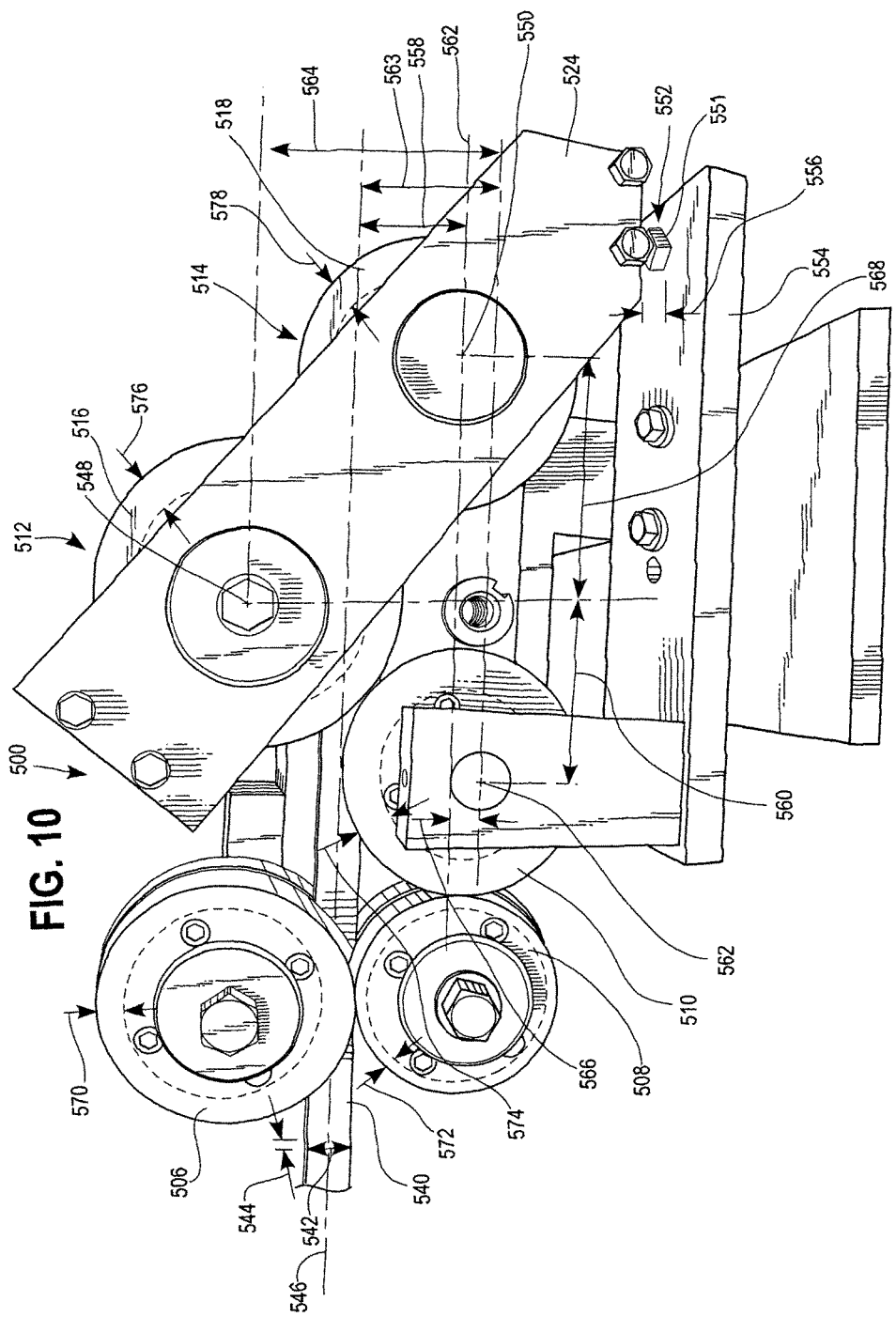

The ring forming sub-method 402 begins at step 406 where a raw material and dimensions of the raw material are chosen. In the illustrated approach, the raw material is the strip of material 540 having a generally flat cross-section with a width 542 and a thickness 544 (see FIG. 10). At step 408 in FIG. 8, the strip of material 540 is advanced into the ring forming device 500, as shown in FIG. 10. The strip of material 540 has a center line 546 extending between central axes 548, 550 of the forming rollers 516, 518 as the strip of material 540 is fed through the rollers 506, 508, 510. To adjust the radius of the ring produced from the strip of material 540, the ring forming device 500 includes a radius adjustment device 552 that adjusts the position of the arms 524, 526 above a base 554 of the device 500. The radius adjustment device 552 comprises a threaded bolt (not shown) and a nut 551 engaged with threads of the bolt. The plate 528 rests upon the threaded bolt such that rotation of the nut 551 advances/retracts the bolt relative to the base 554 and elevates/lowers the arms 524, 526 a distance 556 above the base 554.

Adjusting the distance 556 between the arms 524, 526 and the base 554 rotates the arms 524, 526 and the roller 518 about the central axis 548 of the roller 516. By adjusting the position of the arms 524, 526, the angle at which the roller 518 bends the strip of material 540 can be adjusted. More specifically, rotating the arms 524, 526 counterclockwise about the axis 548 decreases the radius of the ring produced from ring forming device 500. Conversely, rotating the arms 524, 526 clockwise about the axis 548 increases the radius of the ring.

With reference to FIG. 10, rotating the arms 524, 526 tends to bring the central axis 550 of the roller 518 closer to the centerline 546 of the strip of material 540. Stated differently, rotating the arms 524, 526 counterclockwise about the axis 548 moves the roller 518, decreases distance 558, and increases distances 566, 568. This causes the strip of material 540 to strike the roller 518 closer to the equator of the roller 518 and bend at a relatively sharp angle away from the roller 518. Conversely, rotating the arms 524, 526 clockwise increases the distance 558 and decreases the distances 566, 568. This causes the strip of material 540 to strike the roller 518 farther from the equator of the roller 518 and bend at a relatively softer angle away from the roller 518.

In the illustrated embodiment, the rollers 506, 508, 510, 516 of the ring forming device 500 do not change position as the radius adjustment device 552 is used to adjust the position of the arms 524, 526. Given the stationary nature of the rollers 510, 516, rotating the arms 524, 526 does not change the distances 560, 563, 564. In alternative embodiments of the ring forming device 500, the positions of one or more of the rollers 506, 508, 510, 516 may be adjustable in combination with, or in place of, movement of the roller 518.

In addition to the radius adjustment device 552, slot depths 570, 572, 574, 576, 578 of the feed rollers 506, 508, 510, 516, 518 also control the radius of the ring produced from the strip of material 540, as shown in FIG. 10. The slot depths 570, 572, 574, 576, 578 are selected to position a predetermined amount of the width 542 of the strip of material 540 within the slots 512, 514 of the rollers 516, 518. Further, the slots of the rollers 506, 508, 510, 516, 518 are sized to accommodate the thickness 544 of the strip of material 540. In one approach, the width 542 of the strip of material 540 received within the slot 514 as the material 540 passes through the roller 518 is in the range of between approximately 20% and 90% of the total width 542. This engagement between the roller 518 and the strip of material 540 tends to limit flexing of the strip of material 540 as the strip of material 540 advances through the ring forming device 500.

Figure 11:
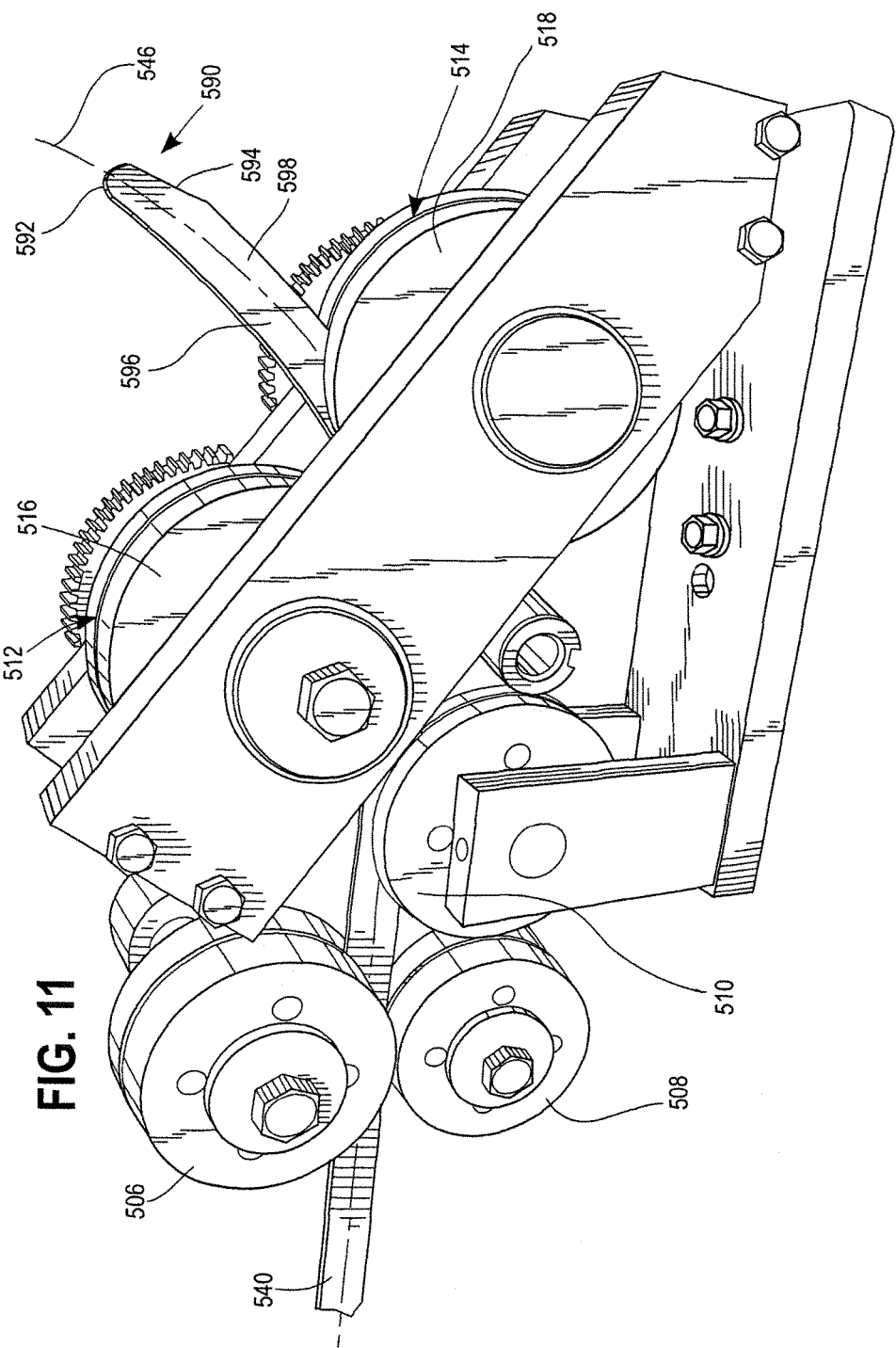

At step 410 in FIG. 8, the strip of material 540 is advanced toward the slotted rollers 516, 518 until a leading end portion 590 contacts the roller 518 and curls upward, as shown in FIG. 11. The leading end portion 590 may include a rounded nose 592 and a flat 594 for contacting the roller 518 and directing the leading end portion 590 upward. In this manner, the roller 518 acts as a curling shoe to curl the strip of material 540. Curling the strip of material 540 compresses a radially inner portion 596 of the strip of material 540 while tensioning a radially outer portion 598 located across the center line 546.

Figure 12:
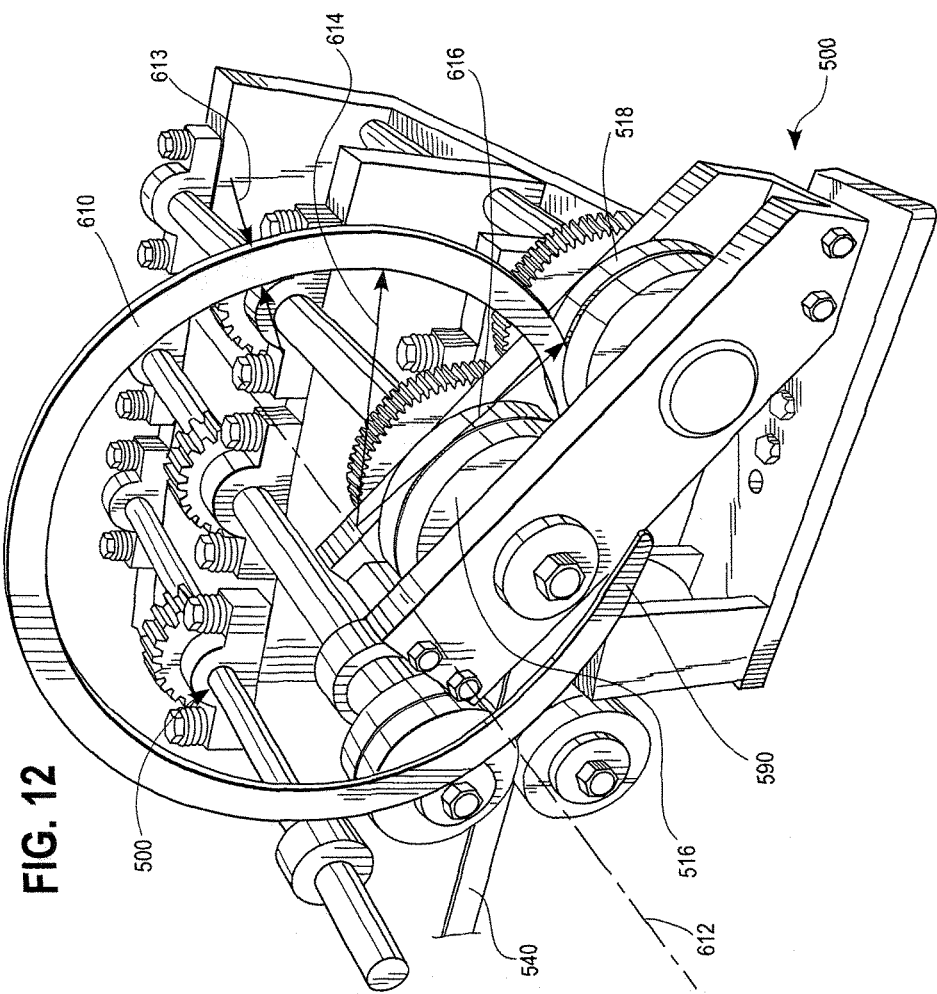

During step 410 in FIG. 8, the strip of material 540 continues to be advanced into the ring forming device 500 until the leading end portion 590 makes a complete loop and the strip of material 540 forms a ring 610, as shown in FIG. 12. The ring 610 can extend in a generally annular configuration for greater or less than 360° as desired for a particular application. The ring 610 has inner and outer radii 614, 616 and a ring width 613 defined between the inner and outer radii 614, 616. The process of bending the strip of material 540 into the ring 610 may create a wave in the ring 610 along the ring width 613. To minimize the waviness of the ring 610, the dimensions of the strip of material 540 may be selected to provide a predetermined ratio of the inner radius 614 to the width 542 (see FIG. 10). For example, the ratio of the inner radius 614 to the width 542 may be in the range of approximately 0.5:1 to approximately 46:1. Further, the dimensions of the strip of material 540 may be selected to provide a predetermined ratio of the outer radius 616 to the width 542. For example, the ratio of the outer radius 616 to the width 542 may be in the range of approximately 2.5:1 to approximately 48:1. These ratios can be adjusted to accommodate different thicknesses 544 of the strip of material 540, as well as different materials, chemistries, and material treatments. The following table presents exemplary ratios for several products having a ten-inch outer diameter:

| Type of Product | Ratio of Ring Inner Radius to Strip Width | Ratio of Ring Outer Radius to Strip Width |
| --- | --- | --- |
| Forward Curved Wheel | 18:1 | 20:1 |
| Forward Curved Strip Wheel | 38:1 | 40:1 |
| Backward Inclined Wheel | 0.5:1 | 2.5:1 |
| Backward Curved Wheel | 0.5:1 | 2.5:1 |
| Mixed Flow Wheel | 8:1 | 10:1 |
| Orifices and Inlet Rings | 3:1 | 5:1 |

Figure 13:
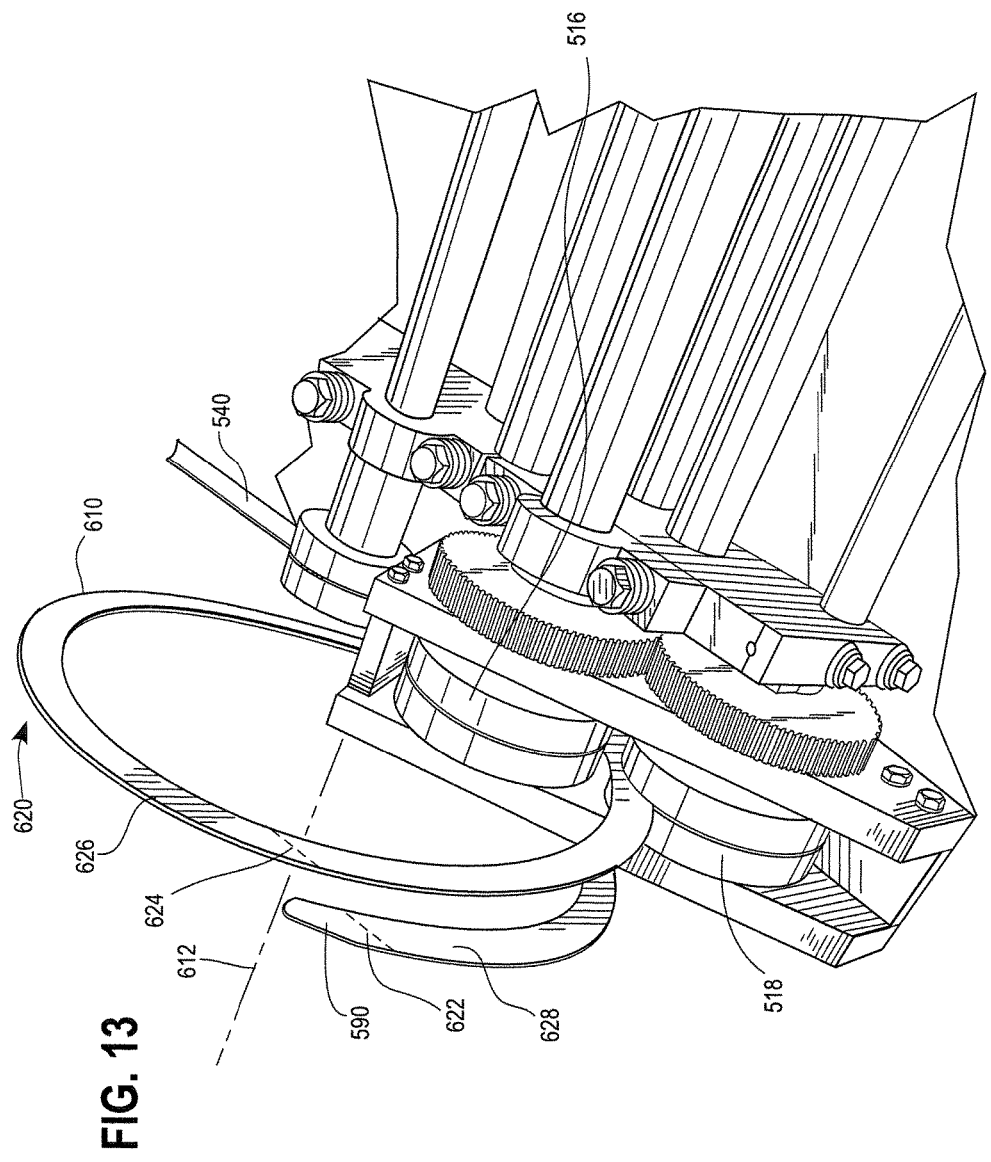

Continued advancing of the strip of material 540 into the ring forming device 500 produces a helix 620 at step 410, as shown in FIG. 13. The helix 620 wraps around a center axis 612 and is directed to the side of the ring forming device 500. At step 412 in FIG. 8, the ring 610 is cut from the helix 620 and at step 414, mating ends of the ring 610 are formed. Steps 412 and 414 may be combined such that cutting the ring 610 from the helix 620 forms one or both of the mating ends of the ring 610. For example, as indicated in FIG. 13, the ring 610 may be cut from the helix 620 by creating bevel cuts along paths 622, 624 so that ends 626, 628 of the ring 610 can be flush with one another after the ring 610 is removed from the helix 620. Other approaches may be used to remove the ring 610 from the helix 620, such as using a radial cut. In one approach, the strip of material 540 continues to be advanced into the ring forming device 500 to generate a larger helix 620 with several rings 610 before the helix 620 is separated from the strip of material 540. The rings 610 may then be cut from the helix 620.

Figure 13B:
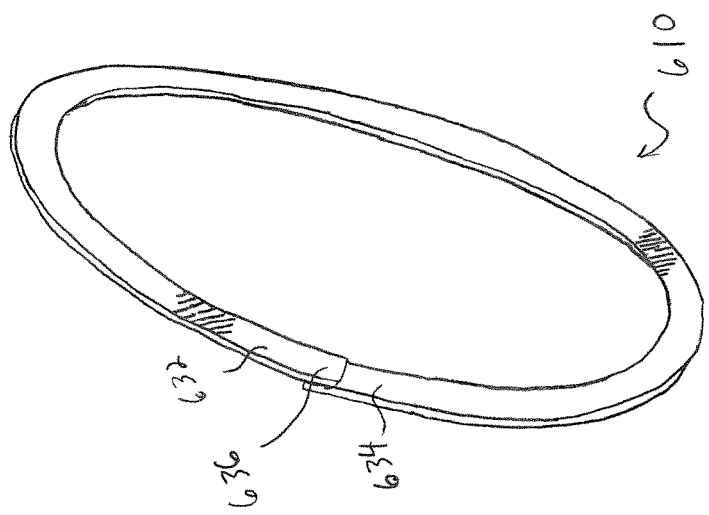
FIGS. 13A and 13B are perspective views of rings formed using the sub-method of FIGS. 9-13.
Figure 13A:
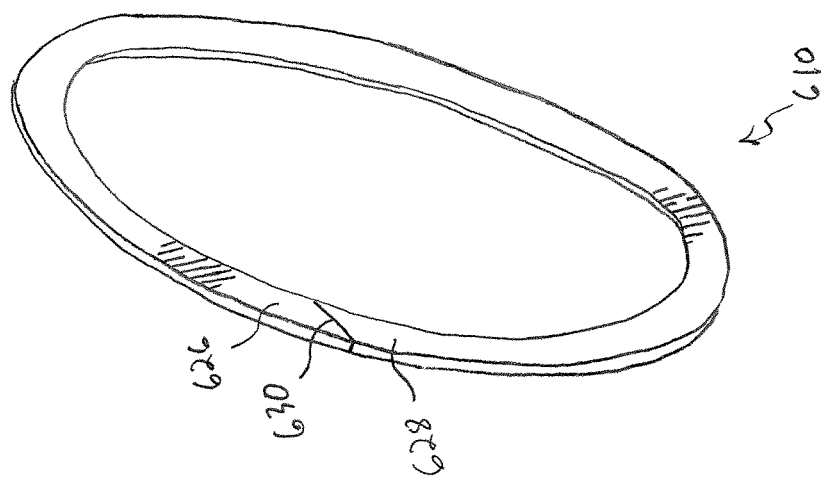
Figure 14:
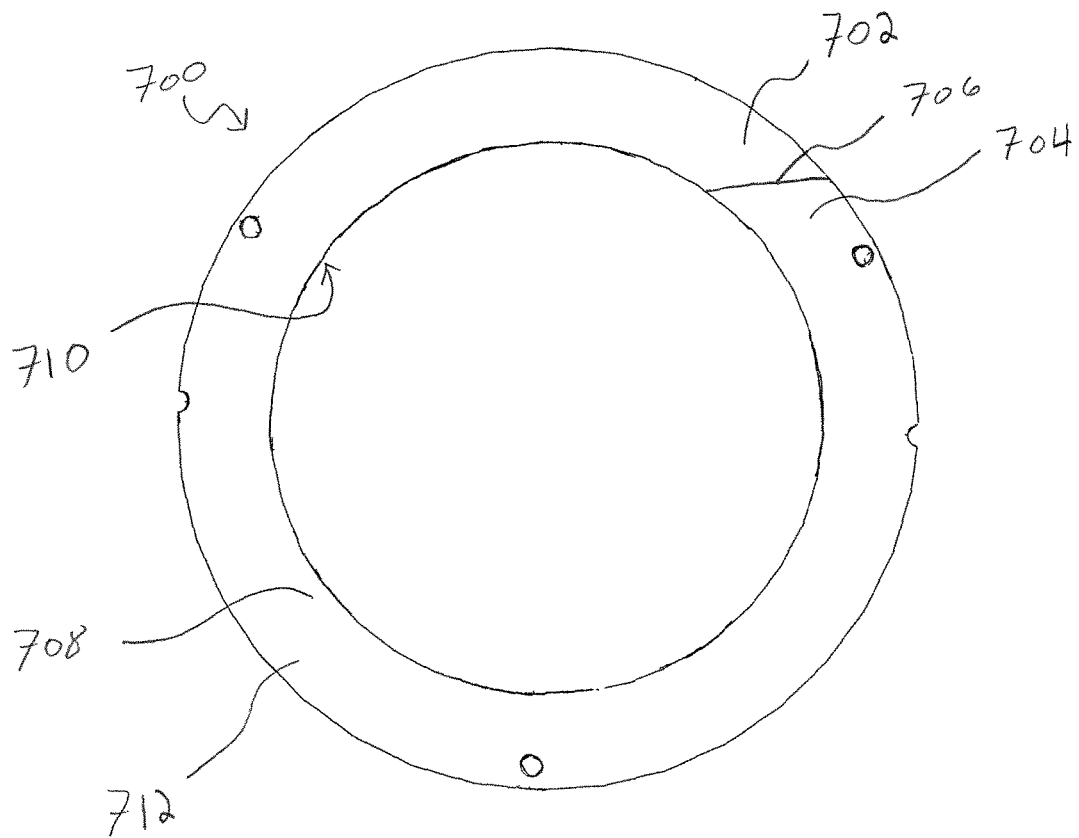
FIG. 14 is a top plan view of an orifice.
Figure 15:
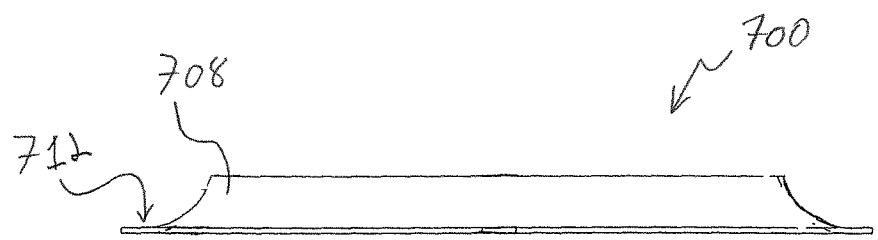
FIG. 15 is a side elevational view of the orifice of FIG. 14.

At step 416 in FIG. 8, the mating ends 626, 628 are optionally joined together using, for example, a YAG laser-welding procedure. As shown in FIG. 13A, the ring 610 has mating ends 626, 628 joined together at a weld 630. Joining the mating ends 626, 628 of the ring holds the ring 610 in an annular configuration and provides a rigid structure for subsequent processes, such as for connecting the fan blades 26 to the ring 610. For some applications of the ring 610, such as an orifice for a blower housing assembly, the mating ends 626, 628 need not be joined together.

The mating ends of the ring may be joined together using alternative approaches, such as spot welding, parent metal fastening, or mechanical fasteners. For an approach such as spot welding, the ring 610 may be longer than 360° so that there are overlapping portions of the ring 610 that can be spot welded together. For example, the ring 610 may have end portions 632, 634 that overlap and are joined at a spot weld 636, as shown in FIG. 13B. If the ring 610 with overlapping portions 632, 634 is used in a fan assembly application, such as for the hub ring 22 of the fan assembly 10 (see FIG. 1), it is preferred to utilize at least one other ring 610 with overlapping portions in the fan assembly 10, such as the end rings 28 and 30, to evenly balance the fan assembly 10. More specifically, the overlapping portions 632, 634 of the rings 610 are spaced evenly around the fan assembly 10, i.e., the overlapping portions of the hub ring 22 and end rings 28, 30 would each be separated by approximately 120° from one another around the circular profile of the fan assembly 10. Weights or other corrective measures could be then applied to the fan assembly 10 to balance the fan assembly 10 after the blades 26 have been installed.

At this point, the completed ring 610 enters the finishing sub-method 404 of FIG. 8, which will be described in greater detail with respect to FIGS. 1 and 14-16. If the final product is to be a venturi or orifice at step 418 in FIG. 8, the shape of the orifice may be formed at step 420. The orifice can be utilized on mixed flow fans, blower housing inlets, backward inclined centrifugal fan assemblies, and backward curved centrifugal fan assemblies, to name a few applications. In one approach the ring 610 can be formed into an orifice 700, shown in FIGS. 14 and 15, at step 420 in FIG. 8. The ring 610 can be formed into an orifice 700 using spinning or forming in a die. The orifice 700 includes ends 702, 704 that correspond to the ends 626, 628 of the ring 610 in FIG. 13. The ends 702, 704 are joined at a weld 706, which was applied at step 416 in FIG. 8 before the ring 610 entered the finishing sub-method 404. The orifice 700 includes a neck portion 708 defining an inlet 710 and a flange portion 712 for connecting to the associated fan assembly, blower housing structure, or other component. In another approach, the ring forming device 500 simultaneously bends the strip of material 540 into the ring 610 and forms features of an orifice into the ring 610 such that a substantially complete orifice 700 exits the ring forming device 500. In this approach, the rollers 506, 508, 510, 516, 518 are configured to impart the desired curvature of the orifice 700, such as the neck portion 708, as the strip of material 540 is advanced through the ring forming device 500. The orifice 700 may be made from galvanized steel, aluminized steel, aluminum, or stainless steel, among other materials.

Figure 16:
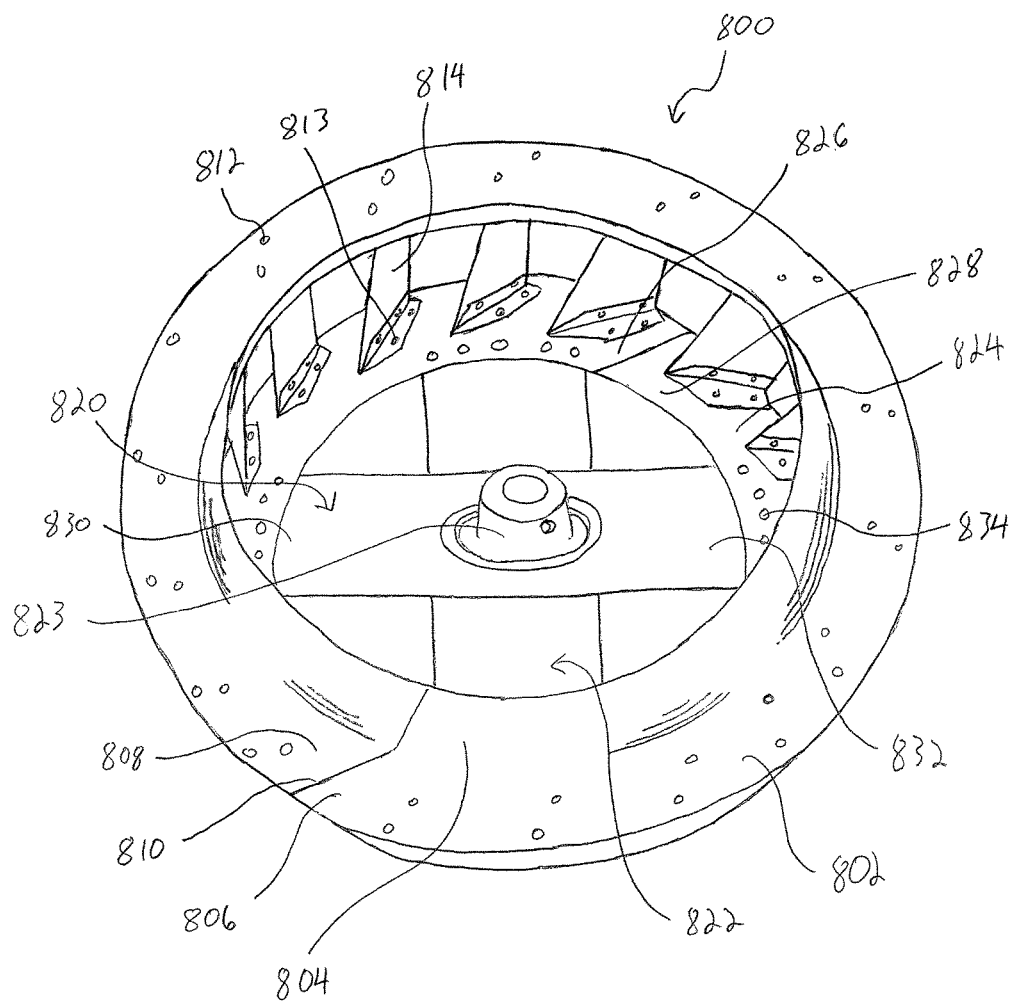
FIG. 16 is a perspective view of another fan assembly.

If the ring 610 is to become an end ring at step 422 in FIG. 8, the ring 610 may be shaped at step 424. For example, the end ring 28 of the fan assembly 10 in FIG. 1 may not require additional forming. By contrast, a backward inclined centrifugal fan assembly 800, as shown in FIG. 16, has an end ring 802 with an integral orifice 804 formed using a die press or other forming method at step 424. The forming of the orifice 804 into the end ring 802 is one example of the shaping that may occur at step 424 in FIG. 8. Like the orifice 700, the end ring 802 has ends 806, 808 that correspond to the ends 626, 628 of the ring 610. The ends 806, 808 are joined at a weld 810, or other joining method, which was applied at step 416 in FIG. 8 before the ring 610 entered the finishing sub-method 404.

At step 426 in FIG. 8, attachment points for connecting fan blades to the end ring are added to the end ring. For example, slots may be formed in the end ring if the end ring is similar to the end ring 28 of the fan assembly 10. For the end ring 802 of the fan assembly 800, rivets 812 are used to connect a plurality of blades 814 to the end ring 802.

If the ring 610 is to become part of a hub assembly at step 428 in FIG. 8, the ring 610 is used as a hub ring and shaped at step 430 if needed. Further, fan blade attachment points may be formed on the hub ring at step 430. A hub assembly produced at step 428 using the ring 610 may replace a back disc for, among other applications, a forward curved single inlet centrifugal fan assembly, a backward inclined centrifugal fan assembly, a backward curved centrifugal fan assembly, and a mixed flow fan assembly. A centrifugal fan assembly produced using the ring 610 may be any type of centrifugal air moving device having forward curved blades or other blade configurations. Similarly, a hub assembly produced using the ring 610 can replace a central disc for, among other applications, a forward curved double inlet centrifugal fan assembly or an end disc for a forward curved tangential fan assembly.

For example, the ring 610 may be used as a hub ring 22 of the fan assembly 10 with a minimal amount of shaping and the addition of slots 24 at step 430. Similarly, the ring 610 may be used as a hub ring 824 of the fan assembly 800 with minimal shaping and the addition of holes to receive rivets 813 which secure the plurality of blades 814 to the hub ring 824. As shown in FIG. 16, ends 826, 828 of the hub ring 824 correspond to ends 626, 628 of the end ring 610.

At step 432 in FIG. 8, one or more hub strips for joining to the hub ring may be stamped from a coil of material, such as hub strips 18, 20 of the fan assembly 10 or the hub strips 820, 822 of the fan assembly 800. At step 433, the one or more hub strips may be shaped, such as shaping the hub mounting portions 90, 98 of the hub strips 18, 20 of the fan assembly 10 (see FIG. 4). By contrast, the hub strips 820, 822 are illustrated in FIG. 16 without mating portions, such that shaping the hub strips 820, 822 at step 433 is unnecessary.

At step 434 in FIG. 8, a hub may be connected to the hub strips, such as connecting a hub 823 of the fan assembly 800 to the hub strips 820, 822. For rigidity purposes and/or to influence the resonance frequency of a fan assembly, the hub strips 820, 822 may be joined together before the hub strips 820, 822 and the hub 823 are connected to the hub ring 824. The hub strips 820, 822 may be joined together using welds, rivets, or other approaches. In some applications of the method 400, the step 434 is not performed, such as when the hub 823 is integrally formed with one of the hub strips 820, 822. Further, the step 434 may be omitted when a fan assembly does not utilize a hub, such as when the hub strips 820, 822 have a mounting point or feature for direct attachment to a shaft or clamp.

At step 436 in FIG. 8, the attachment portions of the hub strips are connected to the hub ring. For example, the tabs 60, 62 of the hub strip 18 (see FIG. 3) are spot welded or joined by some other method to the hub ring 22. The hub strip 820, by contrast, has attachment portions 830, 832 connected to the hub ring 824 using rivets 834.

Returning to FIG. 8, if the ring 610 is to be used for a product other than an orifice, an end ring, or a hub assembly, the ring 610 goes on to subsequent processing at step 438 to produce the desired product.

It will be understood that various changes in the details, materials, and arrangements of parts and components which have been herein described and illustrated in order to explain the nature of the fan assembly and method may be made by those skilled in the art within the principle and scope of the fan assembly and method as expressed in the appended claims. Furthermore, while various features have been described with regard to a particular embodiment or a particular approach, it will be appreciated that features described for one embodiment also may be incorporated with the other described embodiments.

What is claimed is:

1. A fan assembly comprising:
a plurality of curved blades having opposite end portions;
a first end ring directly connected to one end portion of each of the plurality of curved blades and rotatable about an axis of rotation;
a second end ring directly connected to another opposite end portion of each of the plurality of curved blades and rotatable about the axis of rotation;
the plurality of curved blades extending axially between the first and second end rings and parallel to the axis of rotation;
a hub ring connected to the plurality of curved blades intermediate the first and second end rings, the hub ring having a split-ring configuration with ends of the hub ring rigidly fixed relative to one another;
a hub strip having an attachment portion connected to the hub ring and a body portion extending radially inward from the attachment portion; and
wherein the hub strip has an elongate configuration with the attachment portion at one end of the hub strip and another attachment portion connected to the hub ring at an opposite end of the hub strip.

2. The fan assembly of claim 1 further comprising another hub strip having an attachment portion connected to the hub ring and a body portion extending radially inward from the attachment portion.

3. The fan assembly of claim 1 in combination with an electric motor having a driveshaft, the hub strip body portion being fixed to the driveshaft of the motor.

4. The fan assembly of claim 1 wherein the end rings include slots sized to receive the end portions of the plurality of curved blades and the end portions of the plurality of curved blades include tabs bent against the end rings.

5. The fan assembly of claim 1 wherein the hub strip attachment portion has a generally flat configuration that overlaps the hub ring at the connection therebetween.

6. The fan assembly of claim 1 wherein each attachment portion of the hub strip includes a plurality of tabs welded to the hub ring.

* * * * *